Patented Feb. 28, 1950

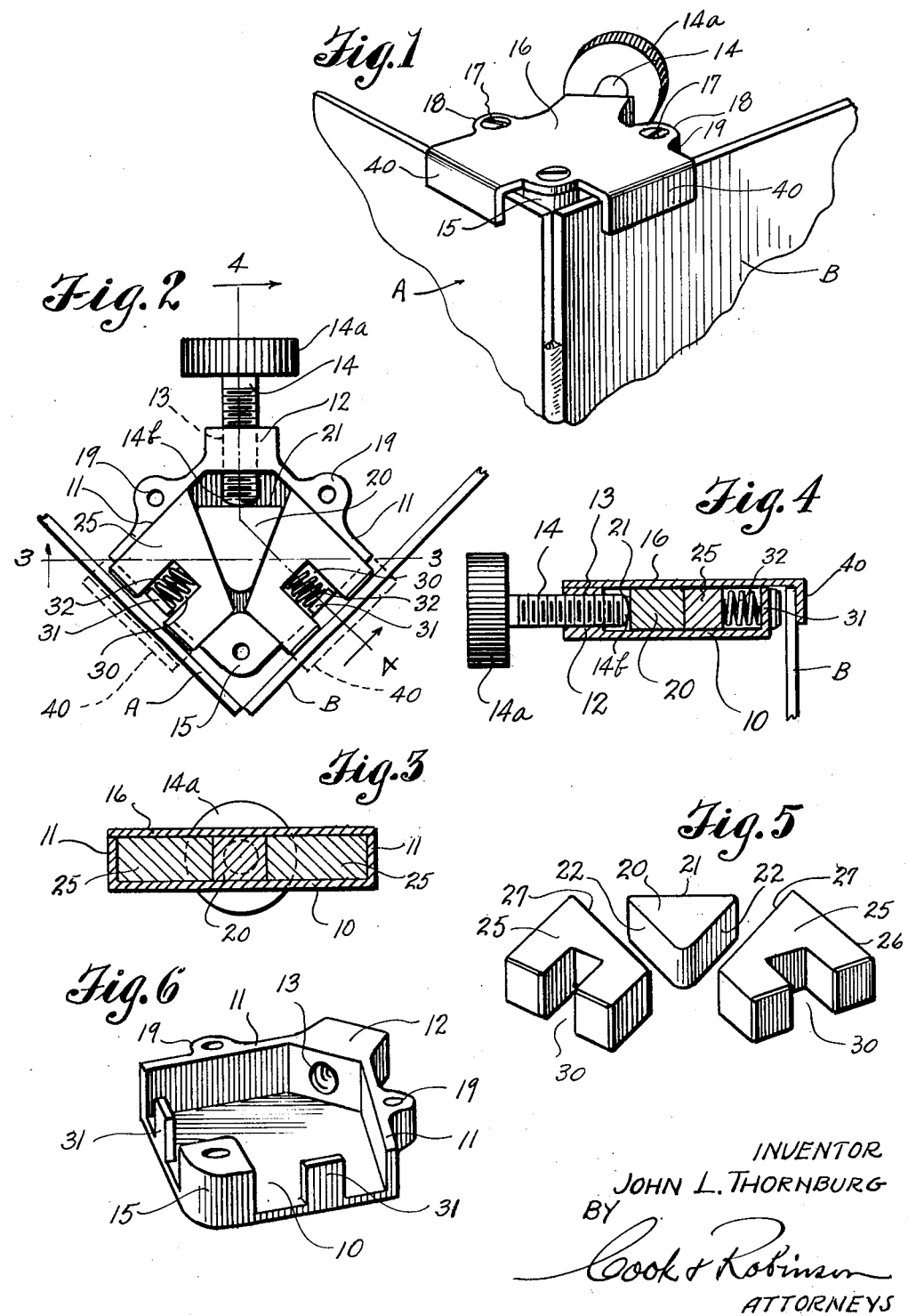

2,498,725

UNITED STATES PATENT OFFICE 2,498,725

CORNER CLAMP

John L. Thornburg, Bremerton, Wash.

Application September 4, 1945, Serial No. 614,207

3 Claims. (Cl. 113—99)

This invention relates to what are generally referred to as "corner clamps" and which are designed primarily for the temporary securing of two plates, or the like, in edge to edge position for being joined to form a right angle corner. More particularly, the invention has reference to a clamp for holding two metal plates in a desired right angle relationship for being welded or otherwise joined together along the corner joint.

It is the principal object of this invention to provide a corner clamp of the above kind, whereby plates of different thicknesses may be readily accommodated; whereby the plates may be held securely and rigidly in right angular relationship for being welded together or otherwise secured and without the clamp, as so applied, interfering with the welding of the corner joint.

Another object of the invention is to provide a clamp that readily and automatically adapts itself to use where the plates to be joined are of different thicknesses and wherein the clamping and holding action against both plates is accomplished by tightening of a single thumb screw.

Still further objects and advantages of the invention reside in the specific details of construction of parts, in their relationship, mode of operation and use, as will hereinafter be fully described.

In accomplishing these and other objects of the invention, I have provided the improved details of construction, the preferred forms of which are illustrated in the accompanying drawings, wherein—

Fig. 1 is a perspective view of a corner clamp embodied by this invention, showing it as functionally applied to two corner forming plates.

Fig. 2 is a top view of the same, with the cover plate of the clamp housing removed for better illustration of the enclosed clamp jaws and the jaw actuating wedge block.

Fig. 3 is a cross section of the clamp taken on line 3—3 in Fig. 2.

Fig. 4 is a cross section on the angular line 4—4 in Fig. 2.

Fig. 5 is a perspective view of the clamp jaws and wedge block disassembled from the clamp housing.

Fig. 6 is a perspective view of the clamp housing with cover plate, jaws, wedge block and clamp screw removed.

Referring more in detail to the drawings, the present clamp device comprises a clamp housing made up of a flat bottom plate 10, substantially square in shape, equipped along two of its adjacent edges with integral, right-angle side walls 11—11, and at that corner of the plate at which these walls converge, having an integral boss 12 in which an internally threaded bore 13 is formed.

Threaded in the bore 13 is the shank 14 of a clamp tightening thumb screw. The axis of the bore 13 within which the screw is threaded, coincides with a plane that equally divides the right angle formed by the walls 11—11 and is also parallel in the plane of bottom wall 10 as will be understood by reference to Figs. 2 and 4. The screw 14 has a turning head 14a at its outer end and has a rounded inner end surface 14b.

At that corner of the housing opposite that which mounts is the thumb screw, is an upstanding lug or post 15 of a height equal to the height of the side walls 11—11. This post has flat side surfaces parallel with the inner surfaces of walls 11—11, so that together they will coact to form guideways for the clamp jaws as will presently be explained.

Overlying the housing that is formed by the plate 10, its side walls 11—11 and the post 15, is a flat cover plate 16 that is secured in place by three screws 17. As noted in Fig. 1, two of these screws 17 are applied downwardly through marginal ears 18 formed on the cover plate, and threaded into lugs or extended bosses on the walls 11—11. The third screw is applied through the corner of the plate and into the post 15.

Fitted within the housing and slidable between the bottom wall 10 and cover plate 16 is the jaw actuating wedge block 20, formed with a flat end surface 21 and converging side surfaces 22—22. The block is of the shape of an isosceles triangle, and is disposed with its flat base surface 21 perpendicular to the clamp screw and engaged by the rounded end 14b of the screw, as seen in Fig. 2. The side surfaces of the wedge block each form an angle of approximately 60° with the base surface.

Also, slidably contained between the bottom wall 10 and cover plate 16, at the opposite sides of the wedge block 20, are clamp jaws 25—25, each having a flat side surface 26, engaged against and slidable on the corresponding side wall 11, and a flat base surface 27 engaged flatly against and easily slidable on a side surface 22 of the wedge block. Each jaw is held in place and guided in its in and out adjustment by the wall 11 with which it engages and a side surface of the post 15.

It will be understood that by adjusting the thumb screw 14 into the housing while engaged against the wedge block, the latter will be advanced accordingly, and that the advancing block operates as a wedge that pushes the jaws apart and outwardly from the housing. The jaws are of such length that when the screw 14 is retracted and the wedge block is disposed at its inner limit of adjustment, and the inner end surfaces 27 of jaws seated thereagainst, the outer ends of the jaws will be substantially flush with side edges of the housing bottom plate 10.

The outer end portions of the jaws are centrally recessed, as at 30, and flanges 31 project up from the edges of plate 10 into these recesses and springs 32 are held under compression between the flanges and bases of the recesses to push the jaws inwardly so that as the screw 14 is retracted, the wedge block 20, which has no fixed connection with the screw, will be moved inwardly accordingly.

The cover plate 16, as noted best in Figs. 1 and 4, extends beyond the outer ends of the jaws and has these edge portions turned down to form flanges 40—40, opposedly coacting with the outer end surfaces of the two jaws. These flanges lie in planes that are at right angles to each other but at their near ends, the flanges are spaced apart as noted in Fig. 1, thus to expose the corner joint. When the jaws are retracted, there will be open spaces between their outer surfaces and the flanges, and it is into these spaces that plate edges are disposed to be held by the clamp.

Assuming the device to be so constructed, its use is as follows:

First the two plates that are to form the corner are brought into the desired relationship; such plates being designated at A and B in Figs. 1 and 2. Then the clamp, with jaws retracted, is applied to the plates from the inside of the corner thus formed, with the top edges of plates received respectively between a coacting jaw 25 and flange 40. Then the screw 14 is tightened against wedge block 20 and the latter pushed inwardly. As wedge 20 moves inwardly, it forces the jaws apart and outwardly, each moving out until its corresponding plate A or B is tightly clamped between the jaw and flange 40. If one plate happens to be of greater thickness than the other, one jaw will then come into clamping contact before the other, but without detriment because continued tightening of the screw 14 will cause the wedge block to continue inwardly but with an incident lateral shifting that continues to advance the other jaw until its clamping function has been fully accomplished. It is in the provision of this freedom of the wedge block for lateral shifting, thus to compensate for different thickness of plates, that an important feature of the invention resides.

With the clamp so applied, the plates A and B will be securely held for welding or to receive other means of connection.

When the screw is retracted, the wedge block is released, and the two jaws, under the pressure of the springs 32, will be retracted to release the clamp.

Devices of this kind may be made in various sizes to meet different requirements and may be made of various materials.

Having thus described my invention, what I claim as new therein and desire to secure by Letters Patent is:

1. A corner clamp of the character described comprising a housing formed with a pair of relatively rigid flanges outset from the housing and in angular relationship, two guideways formed in the housing and respectively perpendicular to the flanges, clamp jaws mounted in the guideways for movement therein independent of each other toward and from the flanges; said jaws having inner end surfaces in angular convergence, a wedge block slidably contained for advancement in the housing between and slidably engaging said inner end surfaces of said jaws, and free for lateral shifting in the housing relative to its normal line of advancement, a wedge advancing screw threaded into the housing and engaging the wedge block to effect an inward advancement of the block and an incident clamping movement of the jaws.

2. A clamp as recited in claim 1 wherein the wedge block is of the form of an isosceles triangle and has its opposite side surfaces flatly engaging the inner end surfaces of said jaws and wherein the wedge advancing screw engages in pushing contact with the inner end surface of said wedge block for its advancement, and spring means acts against the jaws and wedge block with retraction of the screw.

3. A corner clamp of the character described comprising a housing formed with a pair of relatively rigid flanges outset therefrom in right angle relationship, guideways formed in the housing perpendicular to said flanges, clamping jaws mounted in the guideways for independent movement from and toward the corresponding flanges for the holding of plates placed between them; said jaws having flat inner end surfaces in angular convergence, a wedge block of the form of an isosceles triangle, free for lateral shifting and disposed between and having its opposite side surfaces in sliding contact with the inner end surfaces of the jaws, and having a flat base surface, and an adjusting thumb screw threaded through a housing wall and engaged with said base wall of the wedge block perpendicular thereto for its inward adjustment, said clamp jaws being longitudinally recessed, flanges on the housing extended into said recesses and springs confined under pressure in the recesses and engaged against the said flanges to move the jaws inwardly when said adjusting screw is retracted.

JOHN L. THORNBURG.

REFERENCES CITED

The following references are of record in the file of this patent:

UNITED STATES PATENTS

| Number | Name | Date |
|---|---|---|
| 620,495 | Ramseaur, Jr. | Feb. 28, 1899 |
| 1,659,676 | Vincent | Feb. 21, 1928 |
| 2,116,263 | Harbaugh | May 3, 1938 |